Dec. 29, 1936.    S. B. CLIFT    2,065,886
KITCHEN UTENSIL
Filed Jan. 14, 1936
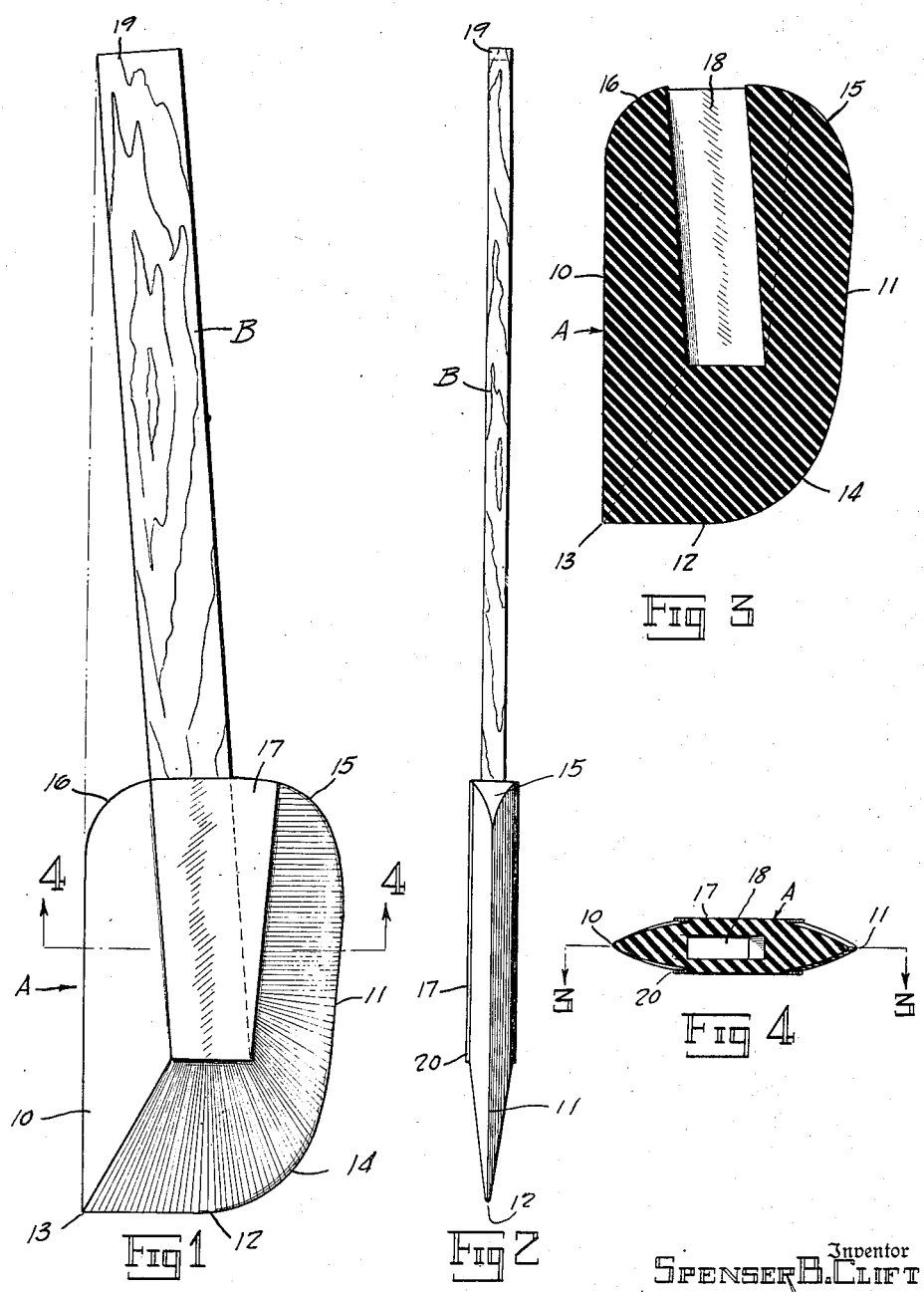
Inventor
SPENSER B. CLIFT
By Joshua R H Potts
Attorney Patented Dec. 29, 1936

2,065,886

UNITED STATES PATENT OFFICE 2,065,886

KITCHEN UTENSIL

Spenser B. Clift, Pasadena, Calif.

Application January 14, 1936, Serial No. 59,015

2 Claims. (Cl. 15—245)

This invention relates to utensils that are commonly availed of for scraping purposes in the cleaning of pots, pans, dishes, and similar articles, and is more particularly concerned with that type of scraping implement which includes a flexible blade as the scraping element.

At the present time, there is available to the public a utensil of this character which includes a flexible blade that is identified as being of rubber and including a pair of straight scraping edges which are disposed in a nonparallel relationship and which edges are connected at one end by a front scraping edge that forms with one straight edge a sharp corner and blends in with the other straight edge in a rounded corner. This flexible blade is provided with a handle.

This invention has in view, as its foremost objective, the provision of a utensil of the above noted character in which the handle member is so disposed with relation to the scraping edges as to render the utensil more adaptable to use in kitchen service.

More particularly, this invention contemplates an arrangement in which the handle element is angularly disposed with respect to the axis of the flexible blade and this change in the ordinary position of the handle is accompanied by certain desirable beneficial results attendant manipulation of the utensil for the purposes intended.

To the end of providing a highly simplified construction throughout, which lends itself to the easy manufacture of this article, this invention proposes the use of a handle element which is of a uniform cross-section throughout. This cross-section must be sufficiently large to provide a rigid handle capable of withstanding the stresses of actual usage, and provision for anchoring one end of the handle in the flexible blade therefore assumes a very important part of the present invention.

Accordingly, a further object in view is the provision of a flexible blade element of the type noted which includes a centrally thickened or bossed portion which is provided with a recess for receiving one end of the handle. This thickened portion is located centrally of the blade and the sides of the recess have a certain definite angular relationship with the straight scraping edges of the blade so as to insure of the proper disposition of the handle element with respect thereto.

Inasmuch as it is important that the scraping functions of the straight edges of the blade be not interfered with, an important feature of the present invention resides in the particular arrangement of the handle with respect to one of these straight scraping edges. Following this invention, the handle element has one end received in the recess of the thickened portion of the blade, and the other end terminates in a line which is a continuation of one of the straight scraping edges. Were the handle element carried beyond this point, the utility of this scraping edge would be materially impaired.

Various other more detailed objects and advantages associated with the carrying out of the above noted thoughts in a practical embodiment, will in part become apparent and in part be hereinafter stated as the description of the invention proceeds.

The invention, therefore, comprises a kitchen utensil consisting of a flexible blade having a pair of non-parallel scraping edges connected at one end with an edge which forms with one scraping edge a pointed corner, and, with the other edge a round corner, and which blade element is thickened centrally thereof, the thickened portion being provided with a recess which receives one end of the handle element. The recess is so designed as to cause the handle element to assume an angular position with respect to the axis of the blade and this handle element extends rearwardly to a point where one corner of the handle thereof lies in a continuation of one of the straight scraping edges.

For a full and more complete understanding of the invention, reference may be had to the following description and accompanying drawing wherein:

Figure 1 is a plan view of a utensil made in accordance with this invention,

Figure 2 is a side view in elevation of the utensil shown in Figure 1,

Figure 3 is a transverse section through the blade element per se, this form being taken about on the plane represented by the line 3—3 of Figure 4, and Figure 4 is a cross-section taken about on the plane represented by the line 4—4 of Figure 1, with the handle omitted.

Referring now to the drawing, wherein like reference characters denote corresponding parts, a utensil made in accordance with the precepts of this invention, is shown as comprising a flexible blade element which is referred to generally by the reference character A, and a handle member indicated at B.

Ordinarily the blade element A is flexible and made of rubber or a suitable rubber composition. This blade A is formed with straight scraping edges 10 and 11 which are disposed in a nonparallel relationship. At the other end of the blade, these edges 10 and 11 are connected by a front edge 12 which forms with the edge 10 a pointed corner 13 and with the edge 11 a rounded corner 14. At the opposite end, the edges 11 and 10 are rounded off as shown at 15 and 16.

Substantially intermediate the edges 10 and 11 and at a distance removed from the round edge 12, the material of the blade A is appreciably thickened or bossed, as indicated at 17, and this bossed portion is provided with a handle receiving recess 18. One end of the handle element B extends into the recess 18 leaving the free extremity of the handle member B, which is designated 19, at a point where one corner thereof lies in a line that is in effect a continuation of the straight edge 10.

As shown in Figure 2, the thickened portion 17 projects materially above the main body portion of the blade element A, as indicated at 20, and from the bossed portion 17 the material of the blade element A is feathered down to the edges 10, 11 and 12, respectively, as clearly brought out in Figures 1, 2 and 4.

As shown in Figures 1, 3 and 4, the sides of the recess 18 determine the angular position of the handle member B. The length of this handle member is, therefore, intimately interrelated with the angular relationship of the sides of the recess 18 and the straight edge 10.

As brought out in the drawing, the handle member B is of a uniform cross-section throughout which renders its manufacture a comparatively simple process. This member is also sufficiently rigid to withstand the stresses encountered in usage and the accommodation of this rugged construction of the handle of necessity involves the thickening of the flexible blade at the place where the handle is received, and this thickened portion must be of such design as to allow for the angular disposition of the handle.

While a preferred specific embodiment of the invention is hereinbefore set forth, it is to be clearly understood that I am not to be limited to the exact constructions illustrated and described because various modifications of these details may be provided in putting the invention into practice within the purview of the appended claims.

I claim:

1. A kitchen utensil of the character described comprising a flexible blade having a straight scraping edge and formed with a centrally thickened portion, said centrally thickened portion being formed with a handle receiving recess, the sides of which are disposed at an angle with respect to said straight scraping edge, and a handle element of uniform cross-section having one end received in the said recess, with the other end positioned with one corner thereof in a line which is a continuation of the said straight scraping edge.

2. A kitchen utensil of the character described comprising a flexible blade formed with two straight scraping edges which are disposed in a nonparallel relationship, said blade being thickened intermediate said straight edges, said thickened portion being formed with a handle receiving recess, the side edges of which are angularly disposed with respect to both of said scraping edges, and a handle member of uniform cross-section throughout having one end received in the said recess, with the other end being positioned so that one corner thereof lies in a line which is a continuation of one of the said straight scraping edges.

SPENSER B. CLIFT.